United States Patent [19]

Brundage

[11] Patent Number: 4,791,958

[45] Date of Patent: Dec. 20, 1988

[54] SOLENOID CONTROLLED FLUID VALVE

[76] Inventor: Robert W. Brundage, 135 Paradise Rd., Painesville, Ohio 44077

[21] Appl. No.: 58,644

[22] Filed: Jun. 2, 1987

Related U.S. Application Data

[63] Continuation of Ser. No. 563,760, Dec. 21, 1983, abandoned, which is a continuation-in-part of Ser. No. 378,133, May 14, 1982, abandoned.

[51] Int. Cl.$^4$ .................. F16K 31/06; G05D 7/06
[52] U.S. Cl. .................. 137/528; 251/129.02; 251/129.08; 251/129.21; 251/129.18
[58] Field of Search ............ 251/129, 141, 139, 138, 251/129.02, 129.08, 129.21, 129.18; 137/528

[56] References Cited

U.S. PATENT DOCUMENTS

| | | |
|---|---|---|
| 3,069,846 | 12/1962 | Buescher . |
| 3,791,408 | 2/1974 | Saitou et al. ............ 251/129 X |
| 3,945,399 | 3/1976 | Tirelli ............ 251/129 X |
| 4,206,781 | 6/1980 | Salter . |
| 4,268,009 | 5/1981 | Allen, Jr. ............ 251/138 |
| 4,339,109 | 7/1982 | Kawata et al. ............ 251/129 |

FOREIGN PATENT DOCUMENTS 35873 4/1981 Japan ............ 251/129.15

*Primary Examiner*—Arnold Rosenthal
*Attorney, Agent, or Firm*—Watts, Hoffman, Fisher & Heinke Co.

[57] ABSTRACT

A normally open pilot pressure relief valve wherein the opening pressure can be readily controlled by small amounts of electrical power, which does not employ a spring, has improved pressure versus flow characteristics at both high and low pressures. The solenoid-armature magnetic circuit is so configured that: in the designed range of valve opening movement, the magnetic force-displacement curve of the armature has a slope which increases with increasing amounts of solenoid energization. The relieved fluid flows through a longitudinal passage in the armature creating an opening flow force to compensate for the Bernoulli effect at the valve seat as the valve opens. Adjustment means are provided for accurately positioning the armature in its magnetic circuit to compensate for manufacturing tolerances.

10 Claims, 1 Drawing Sheet

SOLENOID CONTROLLED FLUID VALVE

This application is a continuation of application Ser. No. 563,760, filed 12/21/83.

Which is a continuation-in-part of my co-pending application Ser. No. 378,133 filed May 14, 1982, now abandoned which in turn is, in some respects, related to the inventions described in my co-pending patent applications Ser. No. 339,092, filed Jan. 13, 1982, now U.S. Pat. No. 4,553,735 dated 11/19/85, Ser. No. 205,214, filed Nov. 12 1980 and now abandoned, and Ser. No. 189,913, filed Oct. 2, 1980, now abandoned the disclosure all of which specifications are incorporated into this specification by reference.

This invention pertains to the art of fluid valves and more particularly to a pressure control valve such as a pressure relief valve wherein the opening pressure is variably and remotely controlled by a variable electric current supplied to a solenoid.

The invention is particularly applicable to pressure control valves for use in high pressure hydraulic systems, e.g. up to 6,000 pounds per square inch (psi) or greater, wherein the opening or relief pressure is to be electrically controlled and will be described with particular reference thereto although it would be appreciated that the invention is also useable with high pressure gasses or in an on-off valve wherein the maximum pressure does not exceed a predetermined maximum for the maximum designed electrical energization of the solenoid.

The invention is also particularly applicable to pilot type pressure control valves having low flow rates which valves in turn control the opening and closing of larger pressure control valves, and will be described with particular reference thereto, although it will be appreciated that the invention is also useable directly on such larger valves, the primary limitation being the maximum magnetic force which a solenoid coil can exert on its armature where the pole pieces of the solenoid coil and the armature do not have close-spaced axially facing surfaces.

BACKGROUND

Pilot flow pressure control valves are extensively used for controlling the pressures at which a larger control valve will open to relieve or control the pressure in a hydraulic system. Normally, such pilot valves are comprised of a valve element having a surface or surfaces exposed to the hydraulic pressure to be controlled which creates a pressure force tending to open the valve. A compression spring biases the valve element to the closed position. When the pressure force exceeds the spring force or bias, the valve opens to allow the flow of fluid therethrough. This fluid flow then changes pressure forces on the larger valve allowing it to open and prevent further increases in the fluid pressure.

To determine the opening pressure, the amount of spring compression or bias force on the valve element is initially adjusted at the time of manufacture or is controlled in the field my means of a threaded member which is rotated either manually or by an electric motor.

The use of springs to determine the opening pressure of the valve presents three problems. First, manual adjustment prevents remote control and electric motor adjustment is expensive, bulky, relatively slow to react and requires relatively large amounts of pulsed electrical power. Computer control of such valves in industrial processes is difficult.

Secondly, springs inherently give to the valve a rising pressure versus flow characteristic. Thus, as the valve opens to permit flow, the spring is compressed. As the spring is compressed its bias force increases. A progressively higher fluid force or fluid pressure is required to open the valve further and further. For example, with a spring having a force versus compression rate (hereinafter called "Spring rate") of 30 pounds per inch, to fully open a pressure control valve 0.020 inches, requires an increase in force of 0.60 pounds. With a 0.030 inch diameter valve seat, this calculates to a pressure increase of 84.8 pounds per square inch (psi) to fully open the valve. With a valve seat of 0.040 inches, the pressure increase calculates to 47.7 psi. This results in rising pressure versus flow characteristic which is considered undesirable for accurate pressure control. It is particularly a problem at the lower inlet pressures where 47.7 psi is 47% of 100 psi.

It is not know how to provide a spring biased pilot relief valve which will perform equally well at both high and low pressures. Thus, at low pressures e.g. 100 psi, the valve must open the maximum designed amount to permit the necessary fluid flow to effect operation of the main relief valve. At the higher pressures, e.g. 6000 psi, the valve need only open a very small amount to permit the necessary volume of fluid flow to actuate the main relief valve. Thus, if a low spring rate spring is employed to give good pressure versus flow characteristics at low pressures, when the spring is compressed to require a higher opening pressure, the valve becomes unstable.

If a high spring rate spring is employed to give stability and good pressure versus flow characteristics at high pressure, then the pressure versus flow characteristics at low pressure are poor.

At the higher pressures, this adverse effect of a rising force displacement characteristic of a spring, is exacerbated by the apparent drop in pressure on the valve element as the valve opens due to the conversion of the pressure energy on the element to velocity energy. This effect will hereinafter be referred to as the "Bernoulli Effect." The Bernoull Effect results in an apparent drop of up to about 10% in the opening pressure force on the valve element as the flow increases. This apparent lowering of the pressure force against the increasing spring bias further adversely effects the pressure versus flow characteristics of the valve.

My said co-pending application, Ser. No. 378,133, filed May 14, 1982, now abandoned attempted to overcome many of these problems. In that application, a pilot flow relief valve is described, comprised of: a housing defining an elongated cylindrical cavity having at one end an inlet port defined by a valve seat; a solenoid surrounding a portion of the housing defining the cavity: and a magnetically permeable armature slidable in the cavity, which when the solenoid is energized, biases a valve element having a valve seat engaging surface toward the valve seat with a magnetic force proportional to the degree of energization of the solenoid. When fluid pressure on the valve element creates a pressure force greater than the magnetic force, the valve seat engaging surface is forced away from the valve seat to allow fluid to flow through the inlet port into the cavity and out through a discharge port located adjacent to the inlet port, the amount of flow being proportional to the inlet pressure and the amount of movement of the valve seat engaging surface away from its valve seat.

In that valve, the housing inside of the solenoid is comprised of: a magnetically permeable armature attracting sleeve adjacent the valve seat a magnetically permeable armature supporting sleeve spaced from the attracting sleeve and remote from the valve seat; and, an intermediate magnetically nonpermeable sleeve between the two magnetically permeable sleeves forming a magnetic airgap therebetween.

The armature has a supported end remote from the valve seat slidable in close spaced relationship with and in substantial overlapping relationship with the supporting sleeve and an attracted end adjacent the valve seat slightly overlapping the end of the attracting sleeve adjacent the airgap by a predetermined amount which end is externally tapered toward the valve seat. In addition, the end of the supporting sleeve remote from the valve seat also includes an axially facing, magnetically permeable surface axially spaced a controlled distance from the corresponding end of the armature.

The two magnetically permeable sleeves and the axially facing surface form a shaped magnetic circuit for the solenoid, which circuit, for any fixed degree of solenoid energization, provides a magnetic force on the armature toward the valve seat which, for any fixed solenoid energization, increases as the opening of the valve forces the armature away from the valve seat and decreases its overlap with its attracting sleeve.

A plot of the magnetic force versus the displacement of the attracted end of the armature relative to the attracting end of the attracting sleeve, provides a force displacement curve which as the ends are moved from a negative overlap (axially spaced) to a zero overlap (when the ends are exactly aligned) to full overlap, first rises rapidly as the overlap approaches zero, fflattens in a broad curve to a maximum at approximately zero overlap and then decreases on a generally linear curve to zero as the overlap increases to the maximum.

For proper operation of the valve at all pressures, the initial (or maximum) overlap of the two ends must be adjusted such that: at all solenoid energizations (within the designed range of energization), the segment of the curve of a length corresponding to the designed maximum movement of the valve element away from the valve seat, is always rising. There must always be an overlap.

A segment of the force-displacement curve is selected of a length corresponding to the maximum designed opening movement of the valve which provides the maximum possible bias force while still increasing linearly as the valve element is forced away from the valve seat by increasing hydraulic pressures.

Further testing indicated that as the solenoid energizing voltage increased, the point in the overlap where the maximum force occurs varies, with the maximum forces at higher energizations occuring at the greater degrees of overlap. This means that at the higher relief pressures, (i.e. a higher solenoid energization) a different initial overlap is required than at the lower relief pressures i.e. lower solenoid energization. Such initial overlaps must be fixedly adjusted at the time of manufacture. It was found that if the overlap was adjusted to give the desired slope for the low pressures, the curve sloped downwardly at high pressures. The valve was thus unstable at high pressures. If the initial overlap was adjusted to give a desired slope for high pressure, then at the lower degrees of solenoid energization there was insufficient force for satisfactory operation at the lower pressures.

It was determined that it as necessary to provide, at all degrees of solenoid energization, a magnetic force displacement curve which slopes upwardly through the desired range of movement of the valve element, which in the case of the preferred embodiment is 0.020 inches.

While the stability problem could have been handled by adding a higher rate spring, acting in conjunction with the magnetic forces, this would have made even worse the problem of obtaining the desired volume of fluid flow at low pressure.

THE INVENTION

In accordance with the broadest aspect of the invention, an electro-magnetically controlled valve is provided comprised of: a housing having an elongated cylindrical cavity with a pressure inlet port defined by a valve seat at one end; a valve element having a valve seat engaging surface movable in the cavity: a magnetically permeable armature movable in the cavity: a solenoid surrounding the cavity and associated with the element having an armature attracting pole piece adjacent the inlet port and an axially spaced armature supporting pole piece remote from the inlet port, the armature having a supported end substantially overlapping the supporting pole piece and an attracted end slightly overlapping the attracting pole piece.

Further in accordance with the invention, the overlapping ends of the attracting pole piece and/or the attracted end of the armature are so shaped that as the armature moves into increasing overlapping relationship with the attracting sleeve, the magnetic force-displacement curve decreases at all levels of solenoid energization.

Such a curve is distinguishable from the normal solenoid magnetic force-displacement curve wherein the attracting pole piece and armature have axially facing surfaces and as the armature moves further and further into the attracting pole piece, the magnetic force continuously increases, generally on an asymptotic curve to a maximum when the opposed surfaces come into abutting engagement.

Thus in accordance with the invention, the attracting pole piece and the armature cannot have any axially facing surfaces close enough to create any appreciable magnetic force on the armature.

The axially spaced pole pieces and the armature form what may be referred to as a "magnetic circuit" wherein the flux flows radially from one pole piece into the armature, axially through the armature and radially outwardly into the other pole piece.

When the solenoid is energized, a magnetic force is created on the armature biasing it towards the valve element to bias the valve element to the valve closed position. This force increases linearly as inlet pressure force on the valve element overcomes the magnetic force and forces the valve element and the armature away from the valve seat. Importantly, this magnetic force acts like a spring, dispensing with the need for a spring found in all prior relief valves.

Further in accordance with the invention, the overlapping ends of the attracting pole piece and/or the attracted end of the armature are so shaped that within the designed range of movement of the valve element from closed to open position, the rate of increase of the magnetic force (i.e. the slope of the curve) increases with increasing amounts of solenoid energization. Thus, at the higher solenoid energizations (and higher relief pressures), the magnetic force-displacement curve has a steeper slope than at lower solenoid energizations (and lower relief pressures). This result cannot be achieved with any kind of a spring.

More specifically in accordance with the present invention, the attracted ends of the field pole and armature are so shaped that the axial end of at least one of the overlapping ends tapers outwardly and toward the valve seat. In other words, the end of the armature facing the valve seat is concave and the end of the attracting pole piece is flat, or the end of the pole piece is convex and the end of the armature is flat or both may have such a taper.

In accordance with the invention, the taper can be a stepped surface, curved or in the preferred embodiment, conical with the included angle of the metal forming the end, being between 20° to 80°. A higher maximum magnetic force is obtained with the larger angles but with a greater force displacement rate while a lower maximum magnetic force is obtained at the lower angle with a lower force displacement rate. Empirical testing indicates that a 30°-35° angle is preferred to give the highest usable force in the operating range.

If both ends are tapered, the included angle of the metal would be the sum of the two angles divided by two.

The extreme end of the armature magnetically saturates with progressively greater amounts saturating as the solenoid energization increases to maximum. For any fixed solenoid energization, the saturation of the end increases as the overlap decreases. This provides a much higher "spring rate" at higher levels of solenoid energization.

COMPENSATION FOR BERNOULLI EFFECT

To compensate for the decreased pressure force on the valve element due to Bernoulli effect, in accordance with the present invention, an axially facing orifice associated with the valve element and/or the armature is provided through which all fluid entering the valve inlet port flows to create a fluid flow force opposing the magentic force and thus decreasing the force biasing the valve element toward the valve seat in an amount proportional to the reduction in the pressure force due to the Bernoulli effect. This results in a flatter pressure versus flow characteristic for the valve at the higher inlet pressures.

As indicated, the slope of the magnetic force-displacement curve increases with increasing inlet pressures. In effect the fluid flow force tends to result in a flatter resultant curve of all the forces.

Further in accordance with the invention, this orifice is in the form of a generally elongated passage. Such an orifice is viscosity sensitive with the result that if the fluid is an oil whose viscosity is higher at lower temperatures, the flow force created by a given volume of fluid flow will be greater than when the oils are hot and less viscous. This arrangement requires a separate fluid outlet port on the end of the housing remote from the inlet port and all relieved fluid entering the inlet port flows longitudinally through the entire length of the housing.

ARMATURE POSITION ADJUSTMENT

A further problem with magnetically controlled valves of the present invention, is in accurately positioning the attracted end of the armature relative to the end of the attracting solenoid field pole during manufacture so that the initial overlap is exactly that desired. Thus, with a magnetic force-displacement curve rising at a rate of 83 pounds per inch, every 0.005 inches variation in the amount of overlap produces 6.6 ounces difference in magnetic force. If the tolerances in the manufacture of the various pieces stack up to ±0.30 without adjustments this will produce a ±40 force ounce variation in magnetic force out of a maxinum of 12 ounces, a ±33% variation and unacceptable.

In accordance with the present invention, means are provided for adjusting the position of the attracted end of the armature relative to the attracting end of the solenoid field pile when the armature is biasing the valve element into engagement with the valve seat. Such means could be a shim positioned between the armature and the valve element but in accordance with the invention, is a threaded member interposed between the armature and the valve element and fixedly and axially adjusted.

In accordance with one aspect of the invention, the armature passage and outlet passage are axially aligned such that the adjustment can be made from outside of the valve housing during the assembly of the valve.

In addition in accordance with the invention, further means are provided for adjustably limiting the movement of the armature away from the valve seat such that the attracted end of the armature is always in at least partial overlapping relationship with the attracting end of the solenoid field pole in the extreme valve open position of the armature. In a preferred embodiment, such means include a threaded sleeve mounted in the end of the housing remote from the inlet port.

OBJECTS

The principal object of the invention is the provision of a new and improved pressure relief or pressure control valve wherein the relief pressure is readily controlled by electro-magnetic means.

Another object of the invention is the provision of a new and improved electrically controlled fluid pressure relief valve having improved pressure vs. flow characteristics.

Another object of the invention is the provision of a new and improved arrangement for the valve seat and the valve member of a fluid valve wherein a more exact alignment of the valve seat engaging surface with the valve seat can be readily obtained in a manufacturing process.

Another object of the invention is the provision of a new and improved electrically controlled pressure relief valve wherein a wide range of pressures can be easily handled.

Another object of the invention is the provision of a new and improved electrically operated fluid valve wherein manufacturing tolerances can be readily compensated for at the time of assembly.

Another object of the invention is the provision of a new and improved electrically controlled pressure relief valve having means compensating for the Bernoulli effect at the valve seat.

Another object of the invention is the provision of a new and improved electrically controlled pressure relief valve wherein the magnetic circuit is such that the peak magnetic force occurs approximately at the same axial position of the armature for all degrees of energization of the solenoid.

Another object of the invention is the provision of a new and improved pressure relief valve which does not require the use of springs.

Another object of the invention is the provision of a new and improved pressure relief valve wherein fluid flowing through the valve flows longitudinally through an orifice associated with the valve seat engaging surface to provide an opening force on the valve element to compensate for the Bernoulli effect at the valve seat.

Another object of the invention is the provision of a new and improved hydraulic relief valve wherein the fluids flowing through the valve create a fluid force active to increase the opening force on the valve element.

Another object of the invention is the provision of a pressure relief valve having improved pressure vs. flo characteristics at all operating pressures.

Still another object of the invention is the provision of a new and improved solenoid magnetic circuit wherein the ends of the armature or of the solenoid field pole are so shaped as to provide a higher than heretofore available magnetic force at the maximum solenoid energization.

Another object of the invention is the provision of a new and improved magnetic solenoid circuit wherein the ends of the armature or the solenoid field pole are so shaped that the magnetic force displacement curve over the operating range of the armature will have an increasing slope with increasing degrees of solenoid energization.

PREFERRED EMBODIMENT

The invention may take physical form in certain parts and arrangements of parts, a preferred embodiment of which will be described in detail in this specification and illustrated in the accompanying drawing which form a part hereof and wherein.

Figure 1:
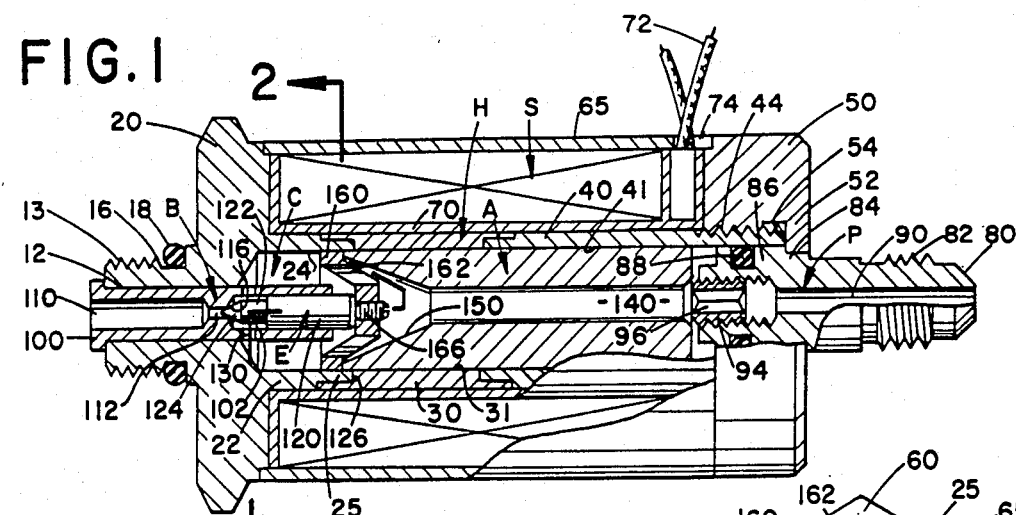
FIG. 1 is a side cross-sectional view partly in elevation showing an electrically controlled, pilot type pressure relief valve illustrating a preferred embodiment of the invention.
Figure 2:
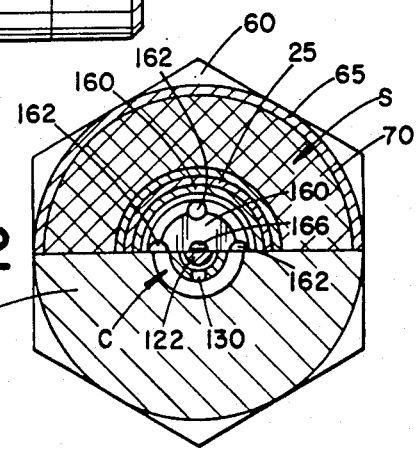
FIG. 2 is a cross-sectional view of FIG. 1 taken approximately on the line 2—2 thereof.

Referring now to the drawing, wherein the showings are for the purposes of illustrating a preferred embodiment of the invention only, and not for the purposes of limiting same; FIGS. 1 and 2 show an electrically controlled hydraulic pressure relief valve comprised generally of an elongated housing H having an internal cavity C, a solenoid coil S surrounding the housing, a solenoid armature A slidable in the cavity, a valve seat forming member B, a valve element E biased toward the valve seat by the armature A, and an outlet port forming member P, all assembled into a single compact unit.

HOUSING

The housing H is generally comprised of three members assembled into a single unitary member preferably by brazing and includes a left hand member 10, which reading from left to right, includes a boss 12, having external threads 14, a groove 16 in which an O-ring 18 is positioned, a hexagonal portion 20 of larger diameter and a sleeve portion 22 having an internal cylindrical surface 24, and an externally rabbeted right end 25 terminating in a right hand facing surface 26 perpendicular to the axis and intersecting the surface 24 at a right angle.

The housing further includes a sleeve 30 having an internal surface 31 of the same diameter as the surface 24, an internally aabbeted left end which mates with the rabbet on the right end of sleeve 22. The right hand end of the sleeve 30 is also internally rabbeted. The housing further includes a sleeve 40 having an internal surface 41 of a diameter the same as surface 24 with its left hand end externally rabbeted to receive and mate with the rabbet on the right end of sleeve 30. These rabbeted surfaces are preferably brazed together so that the members 10, 30 and 40 are structurally integral and with surfaces 24, 31 and 41 defining cavity C. The right hand end of sleeve 40 has external threads 44 to receive and mate with the internal threads of an end cap 50 which includes a radially inwardly extending flange 52 defining an opening therethrough of a diameter less than the diameter of the surface 41, to thus provide a left hand facing shoulder 54, for purposes which will appear hereinafter.

The right hand outer corner of portion 20 is rabbeted to receive the left hand end of a magnetically permeable cylindrical housing 65, which extends into abutting engagement with the left hand end of the cap 50 and provides a housing for the solenoid S.

SOLENOID

The solenoid S is relatively conventional in construction and includes a plurality of turns of electrically insulated wire wound onto a bobbin 70 and has a pair of power leads 72 extending outwardly through a slot 74 in the right hand end of the housing 65.

The solenoids, for best operation, must surround i.e. overlap both sleeves 22 and 40 which form its field poles.

The solenoid S may be energized from any suitable power source. Preferably the power supply is one which delivers a current constant at any preset value. With such an arrangement as the solenoid heats and its resistance changes, the current in the solenoid will remain the same and thus the magnetic force on the armature A will remain the same resulting in a valve having a constant opening pressure at any preset value. A constant voltage power supply can be used, but with the result that there may be some variation in the opening pressure as the valve heats and the resistance of the solenoid coil changes. Dither or pulse width modulated energization causes the valve to be unstable.

OUTLET PORT FORMING MEMBER

The outlet port forming member P has on its right end means for being detachably and seatingly coupled to a hydraulic hose such as the conical surface 80, and threads 82. The member P includes a central portion 84 of a diameter to fit within the opening of the flange 52 and a left hand portion 86 of a greater diameter to fit within sleeve 40 and form a shoulder, abutting shoulder 54. Portion 86 has a groove in which an O-ring 88 is positioned for sealing against the inner surface 41 of sleeve 40. The member P has a longitudinal passage 90 opening through the conical surface 80 and at its left end has a threaded counterbore in which a "Mac-it" sleeve screw 94 is threadably engaged. Such a screw has a self-locking characteristic in any adjusted position. The sleeve screw 94 has a longitudinal, hexagonally shaped passage 96 to coact with a suitable adjusting tool such as an "Allen" wrench. The diameter of the passage 90 is such as to permit the passage of such "Allen" wrench.

VALVE SEAT AND ELEMENT MEMBERS

The valve seat member B is in the form of an elongated tubelike member positioned in a cylindrical opening in the member 10 and has a flange 100 on its left hand end abutting against the left hand end of the threaded boss 12. Member B extends into the cavity C and its right end has a counter bore 102 in which the valve element is slidably supported. The member B also has a counter bore 110 in its left end which is communicated with the bore 102 by a drilled passage 112, which at its right end defines with the base of the bore 102, a valve seat 116.

The valve element E is comprised of a cylindrical portion 120 of a diameter to be slidable supported in the bore 102, and a left hand portion 122 of reduced diameter, the left hand end of which is conically shaped as at 124 to form a valve seat engaging surface for engaging the valve seat 116. The diameter of this valve seat defines the area of the inlet port and thus for a given inlet pressure a determinable pressure force to the right on the valve element E tending to open the valve. The diameter of passage 112 is 0.031 inches for 6,000 psi, 0.043 inches for 3,000 psi and 0.058 for 1,500 psi, maximum inlet pressure. Cross drilled passages 130 communicate the base of the bore 102 with the cavity C.

With this arrangement of the valve sea member B and valve element E, the passage 112 and valve seat 116 are formed at the base of a relatively short cylindrical counter bore and the valve element E is slidable within this bore with its valve seat engaging surface in close proximity to the cylindrical surfaces of its cylindrical portion 120. Maintaining the tolerances on such surfaces during manufacture and thus alignment on assembly is much easier than if the valve seat 116 were formed at the base of the cavity formed by the sleeves 24, 30 and 40. In addition, there are no side or lateral forces on the valve element E which would tend to move its valve seat engaging surface out of alignment with the valve seat engaging surface 116. The this construction is novel in a high pressure valve.

The armature A is generally cylindrical and of an outer diameter to be slidingly supported by the inner surfaces of sleeves 22, 30 and 40. The armature A is made from magnetically permeable material and preferably has its outer surface coated with a thin, approximately 0.001–0.003 inch thickness of Teflon or other anti-friction, magnetically nonpermeable material. The armature A has a longitudinal passage 140, of a predetermined diameter, which forms a viscosity sensitive orifice for the flow of released fluid from the left hand end of the valve through and out of the right hand end of the valve.

The left hand end of the armature A, in accordance with the invention, is concave with the concavity being defined by a conical surface 150 which tapers outwardly from passage 140 toward the valve seat 116 at an angle with the outer surface terminating in a narrow axially facing surface 152. As will appear, the size of angle W and the width of surface 152 have an important effect on the performance characteristics of the valve. This included angle may vary from 20° to 80°, with 35° being preferred. Importantly, the left end of armature A, i.e. surface 152 overlaps the right nnd of sleeve 22 by a distance O which is critical to the proper operation of the magnetic circuit and thus the valve.

A magnetically nonpermeable spacer member 160 is provided between the left hand end of the armature A and the right hand end of the valve piston V, which spacer member 160 has an outer diameter so as to be slidable within the cylindrical surface 24 and has a plurality of axial passages 162 therethrough. The center portion of spacer 160 has a setscrew 166 extending therethrough, the left hand end of which engages the right hand end of the valve element E and the right hand end of which is aligned with passage 140 and slotted to engage a screwdriver.

The left hand axially facing surface 152 of armature A abuts against a corresponding right hand end axially facing surface on spacer 160 such that when armature A has a magnetic force to the left exerted thereon, it biases spacer 160 to the left which, through screw 166, in turn biases the valve piston V to the left i.e. to the valve closed position. By "biasing" is meant an axial force in one direction which when exceeded by an axial force in the opposite direction results in movement of the armature in the latter direction until the forces are in balance or the armature has reached the physical limit of its movement in that direction.

Screw 166 is adjusted by means of an elongated screwdriver inserted through passage 90 in member P, passage 96 in the sleeve screw 94, and passage 140 in the armature A. Screw 166 enables exact adjustment of the position of the left end of armature A i.e. of overlap O after the valve has been assembled. Such exact adjustment is necessary to the proper operation of the magnetic circuit as will appear.

MAGNETIC CIRCUIT

In accordance with the invention, the member 10, (which includes portion 20, sleeve 22), the sleeve 40 and cap 50 are all formed of magnetically permeable material to form spaced field poles for the solenoids. Sleeve 30 is formed of magnetically nonpermeable material and forms what may be termed a magnetic airgap for the solenoid S which, when electrically energized, generates a magnetic flux of opposite magnetic polarity at each end. As such, portion 20 and sleeve 22 will always be of opposite magnetic polarity from sleeve 40 and cap 50.

Further in accordance with the invention, the armature A is also formed of magnetically permeable material, and as shown. includes a right hand supported portion which substantially overlaps the sleeve 40 which hereinafter may be called the supporting field pole of solenoids.

The left hand end of the armature A may be termed the attracted end of the armature, and must slightly overlap at all times the right hand end of sleeve 22 which may be termed, the attracting field pole of solenoid S. Importantly, there are no axially aligned and opposed magnetically permeable surfaces on the armature A and the two sleeves close enough to result in any appreciable magnetic forces between the two. In embodiment shown, the remaining portion of the rabbeted right hand end of the sleeve 22 is approximately twice tee thickness of the remaining portion of the left hand rabbeted end of the sleeve 30.

In the same way, the remaining portion of the rabbeted end of the sleeve 40 is approximately twice the radial thickness of the remaining portion of the right hand rabbeted end of the sleeve 30. In effect, the magnetically nonpermeable sleeve 00 has what may be called a "T" cross section. This gives an improved magnetic circuit because the ends of the poles are adjacent the surface of the cavity and the armature A. If it were possible to obtain the mechanical strength and the exact axial alignment of the sleeves 22, 30 and 40, it would be possible to eliminate the rabbeting of either the sleeve 22 or 40, and from a magnetic standpoint, this would be preferable. Instead of a brazed joint between the rabbets, they could be threaded although such construction is more difficult to machine and to maintain in exact axial alignment.

When the solenoid S is electrically energized, a magnetic flux is generated, which then flows into and through the magnetically permeable members, namely, radially through the cap 50, axially through the sleeve 40, radially into the armature A, axially through the armature A to its left hand attracted end, radially into the sleeve 22, axially through the sleeve 22, and radially through the sleeve 60. Sleeve 65 is of magnetically nonpermeable material.

This magnetic flux creaes a magnetic force on the armature A pulling it to the left, that is toward the valve seat 116, with a force which for a constant energization of solenoid S, varies in accordance with the amount of overlap W.

MAGNETIC FORCE CURVES

Figure 4:
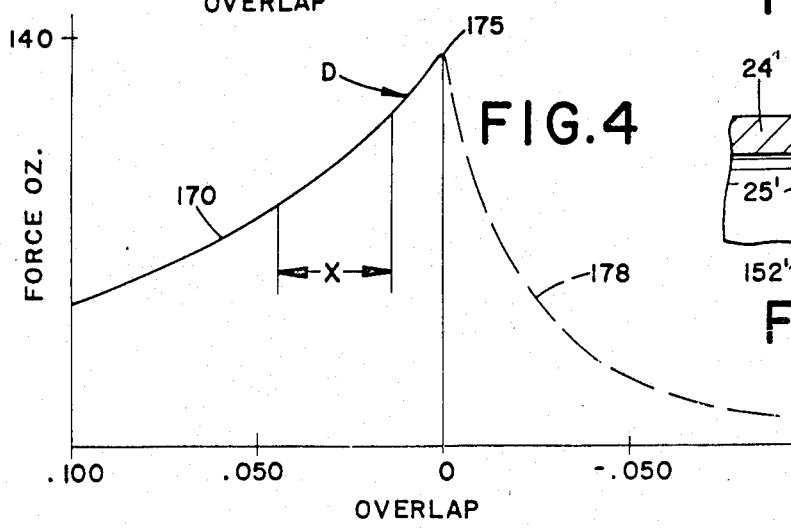
FIG. 4 is a magnetic force-displacement curve of the armature for negative and positive overlaps with the solenoid attracting field pole.

In FIG. 4, curve D shows the variation in the axial magnetic forces on the armature A as the amount of overlap O varies from less than 0 (negative overlap) to 0 0.100 inches (positive overlap) for 10 volts of solenoid energization and an angle W of 35°, the solid line 170 indicating measured values in the usable ranges of overlap and the dashed line 172 indicating estimated values in the unstable, unusable ranges of overlap, zero being where the ends of the attracting sleeve and the attracted portions of the armature are aligned.

As shown by curve D, the axial magnetic force on the armature A as the end of the armature approaches the end of the attracting sleeve increases rapidly on what is believed to be a hyperbolic curve where the force is in proportional to the square root of the negative overlap to a maximum at 175 of approximately 140 ounces at zero overlap. Thereafter, curve 170 shows the force decreasing at a generally decreasing rate until the armature A is magnetically centered relative to the air gap. Dimension X indicates the usable range of the curved.

Figure 5:
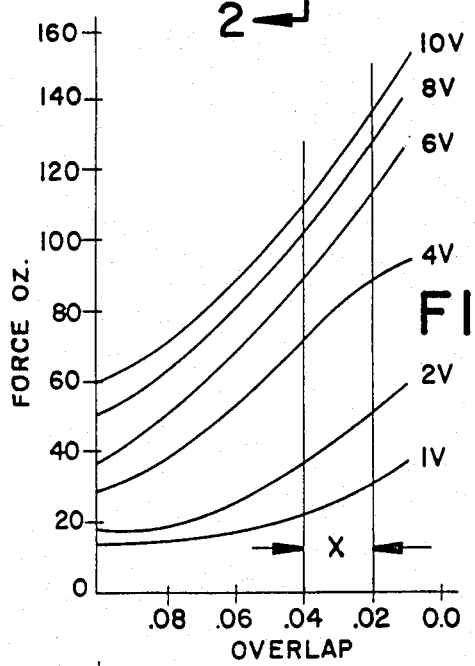
FIG. 5 is a set of magnetic force-displacement curves on the armature of FIG. 1 for varying solenoid energizing voltages; and, FIG. 6 is a view similar to FIG. 3 showing an alternative embodiment of the invention.

FIG. 5 shows the variation in axial magnetic forces on the armature A from zero overlap to a maximum of 0.100 inches with curve 1 V representing 1 volt solenoid energization, curve 2 V two volts, curve 4 V four volts, curve 6 V six volts, curve 8 V eight volts and curve 10 V, the maximum designed energization voltage of ten volts. These curves represent the magnetic forces on the armature A biasing it to the left and thus the valve element 120 to the valve closed position.

The included angle W may vary from 20° to 80°: at the lower angles there is a sacrifice of maximum force, but with the point of maximum force 175 occuring essentially at the same amount of energization for all levels of solenoid overlap. At the higher angles, there is a higher maximum force but with the point of maximum force occuring at differing amounts of overlap with differing degrees of solenoid energization. A reasonable compromise between maximum force and location of the maximum force is attained with angles of 20°–40° with 35° being preferred.

Also the width of surface 152 affects the operation with greater widths acting the same as variations in the angle W. With a 30° angle and up, a with of 0.005 inches is preferred, with a 20° angle width of 0.040 inches being preferred.

The reason for the linear shape of the curves and the increasing slopes on decreasing overlaps with higher levels of solenoid energization is that at the higher levels of solenoid energization, the tip of the end progressively, magnetically saturates.

In the claims, "slightly overlapping" is meant to include an overlap of the armature A with its pole piece of from just greater than 0 to 0.100 inches. "Substantially overlapping" is meant to include an overlap of at least greater than 0.500 inches.

The initial overlap is so chosen that at all levels of solenoid energization, the magnetic force is increasing as the overlap decreases through the maximum design range of movement of the valve element. By properly adjusting screws 94 and 166, the portion of the force versus overlap curve on which the armature moves, may be readily adjusted.

OPERATION

In operation, hydraulic pressure on the left end of the valve element 120 creates a hydraulic force to the right in opposition to the magnetic force on the armature A. When the hydraulic force exceeds the magnetic force, the valve element 20 is moved to the right forcing the armature A to move to the right, but as the armature A is moved to the right, its force to the left increases, thus opposing the opening of the valve in the same manner as a spring with its increasing force as it is compressed.

The valve shown has a maximum designed range of movement of 0.20 inches, and in accordance with the invention, the initial amount of overlap O in the valve closed position is adjusted to approximately 0.040 inches. As the valve opens to its maximum, the overlap will decrease to 0.020 inches.

By adjusting screw 166, the amount of initial (i.e. valve closed) overlap 0 may be readily adjusted. By adjusting screw 94, the maximum movement of the armature A to the right, and thus the minimum overlap may be readily adjusted, all at the time of assembly of the valve.

It is to be particularly noted that with the magnetic circuit described, the relative slope of curves 1V, 2V, 4V, 6V, 8V, 10V progressively increases with increasing energization with the slope of each curve increasing with increasing overlap Inasmuch as the opening pressure of the valve is a function of the degree of energization of the solenoid, it will be appreciated that the magnetic circuit described has a force-displacement rate at the higher pressures which is above that at the lower pressures.

BERNOULLI EFFECT COMPENSATION

When the valve opens, fluid flows inwardly through passage 112, through port 30 into cavity C then through ports 162 and longitudinally through the passage 140 in armature A. This passage in the preferred embodiment has a diameter of 0.250 inches, functions as an axially facing orifice restricting the flow of fluid with a result that there is a pressure drop between the left and right ends of armature A creating a hydraulic flow force to the right on the armature A creating a hydraulic flow force to the right on the armature A proportional to the volume of fluid flowing. By varying the diameter of this passage, the flow force can be varied. This hydraulic flow force being to the right, in effect subtracts from the left hand magnetic force of the armature A on the valve element resulting in a valve having improved flow characteristics. Obviously, the orifice could be formed on or in member 160. Also, the outlet passage could be through the side of the cavity by the formation of appropriate ports.

The valve described is a normally open valve which is closed when the solenoid is energized, the amount of energization determining the opening pressures. For all pressure below the maximum, the valve may be used as a simple on-off valve by simply turning on or off the full energization of the solenoid.

Figure 3:
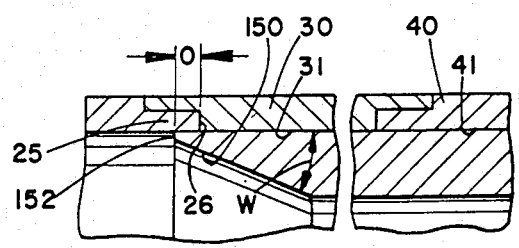
FIG. 3 is an enlarged fragmentary view of FIG. 1 showing the overlap of the attracted end of the armature with the end of the attracting solenoid pole pieces in the valve closed position.

In the embodiment shown in FIG. 3, the end of the attracting sleeve adjacent to the magnetic airgap has a substantial radial thickness and a surface which is perpendicular to the axis while the attracted end of the armature A tapers generally to a blunt point. It is believed that with this construction the magnetically permeable material in the end of the armature A saturates at the higher levels of solenoid energization with the result that the slope of the force-displacement curve increases at the higher degrees of solenoid energization.

Figure 6:
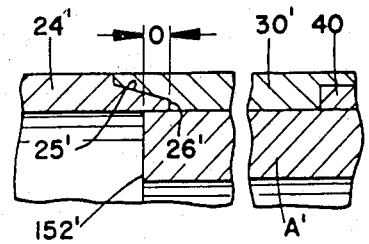

FIG. 6 shows an alternative embodiment of the invention were like parts will be given like numbers with a prime mark (') added. In this embodiment, the left end 152' of armature A' is perpendicular to the axis, while the outer surface 25' of the rabbit on the right end of the attracting sleeve 24' tapers outwardly toward the valve seat and surface 26' has the same radial width as surface 152 in the preferred embodiment. This embodiment is the equivalent of the preferred embodiment in terms of magnetic characteristics.

It is also possible to divide the taper between the armature end and the attracting sleeve end with equal results.

The invention has been described with reference to preferred embodiments. Obviously, modifications and alternations will occur to others upon reading and understanding of this specification, and it is my intention to include all such modifications and alterations insofar as they come with in the scope of the appended claims.

Having thus described the invention, it is claimed:

1. An electrically controlled flow valve comprising in combination:
   a. a housing having an elongated cavity with a pressure inlet port at one end defined by a valve seat and an outlet port at the other end;
   b. a valve element having a valve seat engaging surface movable in said cavity;
   c. a magnetically permeable armature movable in said housing;
   d. a solenoid coil surrounding the housing;
   e. said housing including a magnetically permeable armature attracting sleeve and a magnetically nonpermeable sleeve between said magnetic permeable sleeves;
   f. one end of said armature slightly overlapping the end of said attracting sleeve and the other end substantially overlapping the end of the supporting sleeve whereby when said solenoid is energized, the magnetic force on said armature biases said valve element relative to said valve sea;;
   g. an axial passage in said armature:
   h. threaded means between said armature and said valve element for adjusting the initial maximum overlap of the armature with the magnetically permeable attracting sleeve.

2. An electrically controlled flow valve comprising in combination:
   a. a housing having an elongated cavity with a pressure inlet port at one end defined by a valve seat and an outlet port at the other end;
   b. a valve element having a valve seat engaging surface movable in said cavity;
   c. a magnetically permeable armature movable in said housing;
   d. a solenoid coil surrounding the housing;
   e. said housing including a magneically permeable armature attracting sleeve, a magnetically nonpermeable sleeve between said magnetic permeable sleeves;
   f. one end of said armature slightly overlapping the end of said attracting sleeve and the other end substantially overlapping the end of the supporting sleeve whereby when said solenoid is energized, the magnetic force on said armature biases said valve element relative to said valve seat;
   g. an axial passage in said armature;
   h. threaded adjustable means between the end of the armature and the housing remote from the valve seat for adjusting the minimum overlap of the armature with the end of the magnetically permeable attracting sleeve.

3. The valve of claim 2 wherein said means is a threaded sleeve, said armature passage is axially aligned with said sleeve.

4. An electrically proportional and controlled pressure relief valve comprising in combination:
   a. a housing having a cylindrical cavity;
   b. a pressure inlet port at one axial end of said cavity defined by a valve seat;
   c. a valve element movable in said cavity toward and away from said valve seat and having an end normally engaging said seat with an area or said end defined by said seat exposed to inlet pressure whereby to create a pressure force to open said valve;
   d. a magnetically permeable armature abutting said valve element;
   e. magnetic means for creating a magnetic force on said armature toward said valve seat including:
      1. an armature attracting pole piece adjacent to the valve seat;
      2. an armature supporting pole piece remote from the valve seat and axially spaced from the attracting pole piece; and,
      3. a solenoid coil operatively associated with said pole pieces;
   f. said armature having a first portion remote from the valve seat substantially overlapping the supporting pole piece; and,
      1. a second portion adjacent to the valve seat closely overlapping an end portion of the attracting pole piece in an amount sufficient that when said pressure force causes said valve element and armature to move against the magnetic force, the magnetic force increases.

g. said cavity having an outlet port at the end opposite form the inlet port and said armature having an orifice between its ends through which fluid entering the inlet port flows to the outlet port.

5. The valve of claim 3 wherein said orifice is an elongated passage whereby the orifice is viscosity sensitive.

6. The valve of claim 5 wherein said outlet port and said armature orifice are axially aligned and means adjustable by means inserted through said outlet port and said passage are positioned between said valve element and said armature whereby the initial overlap of the armature may be easily adjusted after assembly of the valve.

7. The valve of claim 6 wherein threaded means are associated between said armature and an abutment at the end of the housing remote from the valve seat whereby the minimum overlap of the armature attracted portion may be adjusted.

8. The valve of claim 7 wherein said threaded means includes a threaded sleeve having a passage aligned with the outlet port and the armature passage.

9. An electrically proportional and controlled pressure relief valve comprising in combination:
   a. a housing having a cylindrical cavity;
   b. a pressure inlet port at one axial end of said cavity defined by a valve seat;
   c. a valve element movable in said cavity toward and away from said valve seat and having an end normally engaging said seat with an area of said end defined by said seat exposed to inlet pressure whereb to create a pressure force to open said valve;
   d. a magnetically permeable armature abutting said valve element;
   e. magnetic means for creating a magnetic force on said armature toward said valve seat including:
      1. an armature attracting pole piece adjacent to the valve seat;
      2. an armature supporting pole piece remote from the valve seat and axially spaced from the attracting pole piece; and,
      3. a solenoid coil operatively associated with said pole pieces;
   f. said armature having a first portion remote from the valve seat substantially overlapping the supporting pole piece; and,
      1. a second portion adjacent to the valve seat closely overlapping an end portion of the attracting pole piece in an amount sufficient that when said pressure force causes said valve element & armature to move against the magentic force, the magnetic force increases.
   g. means disposed between said valve element and armature for adjusting the initial axial position of the armature relative to the valve element, said means including a rigid spacer member and a threded member on said spacer member abutting against said valve element.

10. An electrically proportional and controlled pressure relief valve comprising in combination:
   a. a housing having a cylindrical cavity;
   b. a pressure inlet port at one axial end of said cavity defined by a valve seat;
   c. a valve element movable in said cavity toward and away from said valve seat and having an end normally engaging said seat with an area of said end defined by said seat exposed to inlet pressure whereby to create a pressure force to open said valve;
   d. a magnetically permeable armature abutting said valve element;
   e. magnetic means for creating a magnetic force on said armature toward said valve seat including:
      1. an armature attracting pole piece adjacent to the valve seat, said attracting pole piece defining at least a portion of said cylindrical cavity;
      2. an armature supporting pole piece remote from the valve seat and axially spaced from the attracting pole piece; and,
      3. a solenoid coil operatively associated with said pole pieces;
   f. said armature having a first portion remote from the valve seat substantially overlapping the supporting pole piece; and,
      1. a second portion adjacent to the valve seat closely overlapping an end portion of the attracting pole piece in an amount sufficient that when said pressure force causes said valve element and armature to move against the magentic force, the magnetic force increase;
   g. spacing means form maintaining a substantial air gap between an end of said second portion and an end wall defined by said attracting pole piece such that a magnetic flux path between said second portion of said armature and said attracting pole piece is substantially radial at all operative positions of said armature; and,
   h. magnetic force intensifying means operative to provide a rate of magnetic force increase for decreasing armature overlap that increases with increasing levels of solenoid energization;
   i. said cavity having an outlet port at the end opposite from the inlet port and said armature having an orifice between its ends through which fluid entering the inlet port flows to the outlet port.

* * * * *